(12) United States Patent
Graber

(10) Patent No.: US 12,313,343 B2
(45) Date of Patent: May 27, 2025

(54) CRYOGENIC INTERMEDIATE TEMPERATURE STORAGE SYSTEM

(71) Applicant: ALCOR LIFE EXTENSION FOUNDATION, INC., Scottsdale, AZ (US)

(72) Inventor: Jacob Graber, Scottsdale, AZ (US)

(73) Assignee: Alcor Life Extension Foundation, Inc., Scottsdale, AZ (US)

( * ) Notice: Subject to any disclaimer, the term of this patent is extended or adjusted under 35 U.S.C. 154(b) by 0 days.

(21) Appl. No.: 18/440,351

(22) Filed: Feb. 13, 2024

(65) Prior Publication Data
US 2024/0183622 A1 Jun. 6, 2024

Related U.S. Application Data

(62) Division of application No. 17/200,196, filed on Mar. 12, 2021, now Pat. No. 11,898,801.

(51) Int. Cl.
*F28D 15/02* (2006.01)
*B65D 81/18* (2006.01)
*F28D 15/06* (2006.01)

(52) U.S. Cl.
CPC ......... *F28D 15/0266* (2013.01); *B65D 81/18* (2013.01); *F28D 15/06* (2013.01)

(58) Field of Classification Search
CPC ......... F25D 3/10; F25D 3/105; A01N 1/0284; A01N 1/0252; A01N 1/0262; A01N 1/0257; A01N 1/0263; F61J 1/165; F61D 19/025; F28D 15/02; F28D 15/06
See application file for complete search history.

(56) References Cited

U.S. PATENT DOCUMENTS

| | | | | |
|---|---|---|---|---|
| 7,278,278 B2 * | 10/2007 | Wowk | ..... | A01N 1/146 62/45.1 |
| 2010/0212331 A1 * | 8/2010 | Critser | ..... | A01N 1/10 62/51.1 |
| 2015/0292454 A1 * | 10/2015 | Yoshida | ..... | F02M 37/0076 123/445 |
| 2017/0056289 A1 * | 3/2017 | Tsuno | ..... | F25D 11/00 |
| 2018/0135873 A1 * | 5/2018 | Gold | ..... | F24F 11/30 |

* cited by examiner

*Primary Examiner* — Brian M King
(74) *Attorney, Agent, or Firm* — BYCER & MARION, PLC; Matthew L. Bycer

(57) ABSTRACT

The present invention provides devices and methods for the cryogenic storage of biological material. Devices of the invention are useful for storing material at a predetermined cryogenic temperature. An intermediate storage chamber (ITC) set within an adiabatic Dewar container includes a set, or multiple, heat transfer pipes that passively act to maintain a set temperature or temperature range. Some embodiments utilize an inner heat pipe to transfer heat out to a heat sink and an outer heat pipe to transfer heat into the ITC from a cool sink. The heat pipes may be arranged, designed, and/or filled to conduct heat energy only when set parameters beyond the predetermined range are experienced within the ITC. The method of maintaining a predetermined temperature range by means of a heat sink and cool sink are taught herein.

25 Claims, 7 Drawing Sheets

Simplified schematic of a heat-pipe-regulated ITS chamber

CRYOGENIC INTERMEDIATE TEMPERATURE STORAGE SYSTEM

CLAIM OF PRIORITY

The present divisional application includes subject matter disclosed in and claims priority to U.S. patent application Ser. No. 17/200,196, filed Mar. 12, 2021, entitled "Cryogenic Intermediate Temperature Storage System and Method" (now U.S. Pat. No. 11,898,801, issued Feb. 13, 2024), incorporated herein by reference, describing inventions made by the present inventor.

BACKGROUND OF THE INVENTION

1. Field of the Invention

The present invention relates to cryopreservation of living tissues, and more particularly relates to a cryogenic system and method for maintaining a patient within a storage unit with passive environmental controls.

2. Description of Related Prior Art

Cryopreservation by vitrification partially replaces water inside cells and tissue with chemicals called cryoprotectants that prevent ice formation. After cryoprotective perfusion, a patient must be cooled to a temperature that is low enough to inhibit all potentially harmful chemical reactions, including both biological and those caused by the toxicity of any cryoprotectants that have been introduced. The Arrhenius equation tells us the dependence of the rate constant of a chemical reaction on the absolute temperature as $$k = A^* \exp(-E_a/RT)$$

where, k is the rate constant (frequency of collisions resulting in a reaction), T is the absolute temperature (in Kelvins), A is the pre-exponential factor, a constant for each chemical reaction, $E_a$ is the activation energy for the reaction (in the same units as RT), and R is the universal gas constant.

For many common chemical reactions in tissues, the Arrhenius equation predicts that the reaction rate will be approximately halved for each decrease of temperature of 10 degrees Celsius down to 0 C or 273K. When water in tissue is replaced with appropriate cryoprotectant chemicals, tissue may remain liquid at temperatures below −100 degrees C.

Chemical reactions in the high sub-zero range (tens of degrees below 0 degrees C.) are dominated by cryoprotectant toxicity. Injury from toxicity occurs, but the rate of damage decreases with temperature. Cryoprotectant solutions become highly viscous below −50 degrees C./223K. As viscosity increases exponentially, according to a relation called the Vogel-Fulcher-Tammann Equation, chemical reactions become inhibited by the inability of molecules to move (by diffusion) relative to one another.

At temperatures below approximately −120 to −125 degrees C., ~150K, cryoprotectant viscosity becomes so high (10 trillion Poise) that cryopreserved tissue becomes glasslike and behaves as a solid, thus negating toxicity effects of cryoprotectants. At a temperature near −120° C. the viscous solution solidifies; an event called the "glass transition." This solidification, without formation of ice crystals, is the physical basis of cryopreservation by vitrification. The temperature at which this occurs is known as the glass transition point, often denoted as $T_g$.

However, an undesirable process known as "fracturing" may occur at low temperatures, or as the tissues are cooled below a certain threshold. Fractures complicate future recovery of cryopreserved tissue. Additional cooling below $T_g$ is therefore considered unnecessary, and may pose a risk of fracture, yet many patients are cryopreserved in liquid nitrogen as this serves as an inexpensive, stable, and highly reliable cooling medium. As liquid nitrogen has a boiling point of −196 degrees C. (77K) at atmospheric pressure, fracturing is likely to occur. It is also known that fracturing events may accelerate below −140 degree C/130K. Fracturing can be reduced, and sometimes avoided, by cooling through the glass transition temperature slowly, and stopping cooling at temperatures warmer than liquid nitrogen.

Systems that are able to safely store tissue between $T_g$ and liquid nitrogen may be referred to as "intermediate temperature storage" (ITS). These systems often use an adiabatic Dewar container to maintain proper insulation. Existing ITS solutions are more complex than simple immersion in liquid nitrogen, and often rely on active control systems to move heat energy: electronic or mechanical temperature controllers which activate circulating fans or thermoelectric heating elements. A typical commercial ITS system is cooled by liquid nitrogen, while controlled power provided to heaters works to dynamically raise the temperature to at/near $T_g$. Other ITS systems have been developed using a series of conductors set in a heat sink, utilizing resistors/insulators to prevent energy transfer. A thermal resistor may be set along the conductor from the LN2 heat sink into the ITS, while air/gas may act as a resistor to prevent direct contact of the specimen with the conductor within an ITS. All of these systems suffer the drawback of a reliance on dynamically controlled systems and heavy, often continual, use and depletion of heat sink cooling medium (i.e. liquid nitrogen).

It is therefore a primary object of the present invention to maintain tissue within a temperature window near, at, or below $T_g$.

It is another object of the present invention to provide at least partially self-regulating, or passive, intermediate temperature storage of patients.

It is yet another object of the present invention to maintain a cold chamber while minimizing fracturing in tissues.

It is a further object of the present invention to minimize dependence on caretakers or independent power sources for temperature systems.

It is also an object of the present invention to eliminate control circuitry, heaters, and/or fans in a temperature controlled ITS.

It is also a further object of the present invention to minimize sensitivity to changing external conditions including humidity and temperature.

These and other objects of the present invention will become apparent to those skilled in the art as the description thereof proceeds.

SUMMARY OF THE INVENTION

The present invention s directed to an environmental and/or thermo-regulated cryogenic intermediate temperature system, preferably free of proactive management systems, or electronically regulated temperature controls. The system may maintain environmental temperature within a chamber adapted to contain biological tissues. The chamber may be set in a capsule, the capsule may have insulated, preferably Dewar walls. The capsule may be sealed with a circumferential seal adapted to complementarily mate with the chamber or module set within the capsule. The module, with chamber, may be set on a slide rack to slide into the capsule.

The chamber should be mostly enclosed with insulating walls to set apart an interior space which may house biological tissue and/or patient, and may be set apart the heat sink by an insulating block. An inner heat pipe (IHP) may be used that has a first section with an evaporator thermally coupled with the chamber and second section with a condenser thermally coupled with a heat sink. A further heat pipe, an outer heat pipe (OHP) has a first section with a condenser thermally coupled to the chamber and a second section with an evaporator thermally coupled with a cool sink. The IHP and OHP may include working fluid(s) contained within a preferably otherwise evacuated pipe, or other type of heat pipe as discussed with or without one or more working fluids. The same working fluid may be used in both IHP and OHP, but preferably the IHP and OHP differ in working temperature range characteristics. The OHP may pass through an end wall in the capsule. The IHP may be set along a top surface of the chamber, and may include a vertical section either between the evaporator and condenser, or the condenser may be vertical. The OHP may be set along the bottom of the chamber. The IHP and OHP may be standard heat pipes. The IHP may include a variable conductance heat pipe or a resistor. The IHP may alternatively include a modified heat pipe. The OHP may include a resistor or standard heat pipe. The OHP may include a modified heat pipe.

A thermo-regulated cryogenic intermediate temperature chamber for the storage of biological tissue may include a chamber thermo-coupled with an evaporator of a cooling heat pipe, and a heat sink thermo-coupled to a condenser of said cooling heat pipe. The chamber may be thermo-coupled with a condenser of a warming heat pipe, and a cool sink thermo-coupled to an evaporator of the warming heat pipe. The cooling heat pipe, warming heat pipe, and chamber may all be arranged to maintain a temperature of an interior of the chamber within a predetermined temperature range. Preferably, the cooling heat pipe activates when the chamber interior is above a set cold temperature threshold of at least 100K, and the warming heat pipe activates when the chamber interior is below a set hot temperature threshold of at most 170K. Most preferably a range of between −135 to −155 C is maintained. The cooling heat pipe may use pentane and/or ethane as a working fluid, and the warming heat pipe may use oxygen as a working fluid. The cooling heat pipe may be arranged with a vertical section between the condenser and evaporator, wherein the condenser is lower than the evaporator, and the cooling heat pipe utilizes an axial groove wick.

A thermo-regulated cryogenic intermediate temperature system may include a chamber containing biological tissue coupled to a warming heat pipe, wherein the chamber is thermo-coupled with a condenser of the warming heat pipe. The warming heat pipe may be further thermo-coupled to a cool sink at an evaporator. The chamber may be in fluid communication with a reservoir of a cooling fluid via a cooling gas pathway passing the condenser of the warming heat pipe between the reservoir and the chamber. The system may be arranged to maintain environmental temperature within a chamber without an inner heat pipe, but by circulating gas emissions/evaporated from a cool sink. An outer heat pipe condenser may be thermally coupled with the chamber, and the evaporator thermally coupled with a cool sink. The heat sink may be thermally coupled to the chamber by air flow or fluid conduits. The heat sink may be in fluid communication with the chamber. Fluid may flow from the heat sink into and out of the chamber.

The present invention includes a method for passively maintaining the temperature in a cryogenic chamber within a predetermined temperature range between a low temperature threshold and a high temperature threshold. The chamber may be sealed to contain biological material and a working gas. An IHP evaporator may be thermo-coupled to the chamber and the IHP condenser further thermo-coupled to a heat sink. An OHP condenser may be thermo-coupled to the chamber, with an evaporator thermo-coupled to a cool sink. The IHP thereby causing energy transfer out of the chamber when the temperature of the thermo-coupled inner heat pipe evaporator exceeds the low temperature threshold, and the outer heat pipe causes energy transfer into the chamber when the temperature of the thermo-coupled outer heat pipe condenser drops below a high temperature threshold. Preferably, temperature in the chamber is maintained absent the use of an electronically controlled environmental agents. The inner heat pipe may go dormant below the low temperature threshold, which may be accomplished by a working fluid in the inner heat pipe remaining liquid below the low temperature threshold. The outer heat pipe may go dormant above the high temperature threshold, which may be accomplished by a working fluid in the outer heat pipe remaining vaporized above the high temperature threshold. Both the inner heat pipe and outer heat pipe may be effective within the predetermined temperature range.

BRIEF DESCRIPTION OF THE DRAWINGS

The present invention will be described with greater specificity and clarity with reference to the following drawings, in which.

DETAILED DESCRIPTION OF THE PREFERRED EMBODIMENTS

Figure 1:
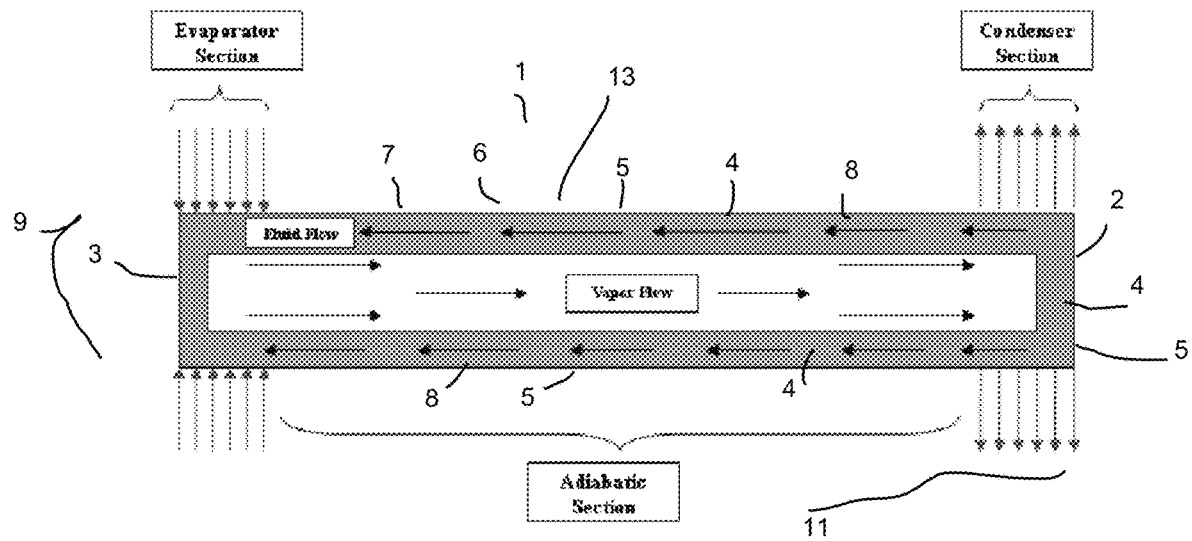
FIG. 1 illustrates a longitudinal cross-section of a standard heat pipe known in the art.

The present invention is directed to a low-maintenance temperature-regulated intermediate temperature storage (ITS) chamber(s) for long-term storage of partial or whole-body patients for long term cryopreservation. Traditional cryogenic storage involves submersion of patients in liquid nitrogen (LN2), but excessively low temperatures may create thermomechanical stresses which can induce cracking of the patient's tissues. The ideal temperature for long-term storage of human patients lies just below the glass transition temperature ($T_g$) of human tissue and cryoprotectant, at which point the patient is fully vitrified but internal stresses do not exceed the strength of the tissue. Specific heat pipes may be used in coordination for regulating the temperature of an enclosed intermediate temperature chamber (ITC). This system is preferably free of active control circuitry, heaters, fans, compressors, and valves, and can be operated independently of power, requiring only periodic refilling of cooling medium (e.g. LN2) via an external port. The method may be accomplished without electronic feedback, and ideally, without any mechanical components which may wear out or are susceptible to frost.

A cooling medium (e.g. LN2) may serve as an internal reservoir as the heat sink. The heat sink may act as a reverse radiator or thermal collector. Preferably, the cooling medium is a liquid nitrogen source or tank. Higher than the boiling temperature of LN2, the preferred temperature range in the ITC is a range of 0 or 10 to 30 degrees C. below $T_g$. Most preferably, the preferred temperature range, with certain cryoprotectants is −136 C (137K) to −120 C (153K) (assuming a $T_g$ of −120 C). This is the ideal temperature range to minimize both tissue fracturing, and cryoprotectant toxicity. A heat pipe, or system of heat pipes, may be used to maintain this temperature range. Heat pipes can be reliable two-phase liquid-gas heat transport systems. As used herein, the term heat pipe is as known in the art, and may be generally described as a closed system of fixed volume containing a fixed quantity of a working fluid, the working fluid often existing in alternating gas and liquid phases. The heat pipe attempts to reach internal equilibrium by equalizing the temperature across its length. At the hot interface of the pipe (or evaporator), heat externally applied to the evaporator causes the working fluid to evaporate and absorb heat. Heat energy is then conducted via the gaseous working fluid as it passes through an (often-hollow) adiabatic section, via vapor pressure, to the opposing end(s) or condenser(s). The resulting vapor condenses to release latent heat of vaporization to through the walls of the heat pipe to a heat sink. Condensed working fluid is transported back to the evaporator along a wick structure inside of the heat pope by capillary action. In this manner, the heat pipe can continuously transport the energy from the evaporator to the condenser by repeating the evaporator-to-condenser and condenser-to-evaporator movement of fluid. This process will continue as long as the evaporator is hot enough to evaporate the working fluid, the condenser is cold enough to condense the working fluid, and there is sufficient capillary pressure to drive the condensed fluid back to the evaporator. When these conditions are not met, the heat pipe ceases to function and lays dormant. A dormant heat pipe may act as a typical thermal resistor to resist heat transfer along its length to the two coupled sections.

The amount of heat absorbed by a given amount of working fluid is an intrinsic material property of the working fluid. The type and quantity of working fluid, the internal volume and pressure of the heat pipe, and gravitational drop, can be selected so that the temperature operating range is closely controlled. Heat pipes may serve the purpose of temperature-dependent conductive pathways, as they do not function when the working fluid phase transition temperature does not lie within the temperature gradient applied across the pipe. The primary advantage of heat pipes in this application is the ability to custom-tailor their operating range.

A system may have two distinct, but co-dependent, heat pathways. One pathway may allow heat energy into the ITC when the ITC is too cold (via a "cool sink"), and the other may remove heat energy out of the chamber when it is too warm (to a "heat sink").

In a preferred embodiment, there are two independent heat pipes operating at different, and preferably overlapping, ranges. A first, outer, heat pipe may connect the external environment to the intermediate temperature chamber (ITC). In the outer heat pipe, the ambient environment may act as a cool sink to allow heat energy to flow into the ITC, when ITC temperatures sink below a predetermined temperature. A second, inner, heat pipe may connect the ITC to the heat sink, such as a liquid nitrogen reservoir. The inner heat pipe may allow heat energy to flow from the ITC to the heat sink, when ITC temperatures rise above a predetermined temperature. By maintaining the heat pipes at differing, and preferably overlapping, operating ranges, the system may create a strong feedback loop wherein energy is only transported into or out of the ITC to correct for deviations outside a predetermined temperature range.

In a preferred embodiment, the outer heat pipe may include a first working fluid designed to condense at the target temperature of the ITC, preferably at the low end of the preferred temperature range. The outer heat pipe working fluid thus may only condense inside the chamber when the temperature is below the target temperature range. In this way, the outer heat pipe fluid remains in a single-phase vapor, known in the art as a "dry-out", thereby eliminating the flow of condensed working fluid required to properly conduct heat energy. Ambient energy from the environment thus may be transported into the ITC via heat pipe action only when the ITC drops below the target temperature range. The outer heat pipe may function as a thermal resistor when ITC is below the threshold temperature(s).

In the preferred embodiment, the inner heat pipe may include a second working fluid designed to vaporize near the top range of the predetermined target temperature range of the ITC. Capillary action of the wick is halted/slowed when the working fluid remains liquid in the evaporator section, thus halting/slowing the heat flow out of the ITC. An initial reservoir for the liquid working fluid may be set down and lower, with respect to gravity, to allow gravitational pooling of liquids to prevent or slow heat exchange action until liquid is vaporized at the target temperature. In this way, heat energy from the ITC may only be efficiently transported into the heat sink when the chamber rises above the target temperature. The target temperature range of the chamber can therefore be selected by using working fluids specially adapted to maintain a relatively narrow predetermined temperature range between the heat sink and ambient temperatures.

Using identical working fluids and construction design for both inner and outer heat pipes is not always ideal for energy efficiency, since they will both be transporting heat when the chamber is at equilibrium. By using two slightly different working fluids or varied pipe design/pressure(s) that cause the heat pipes to operate at alternative or overlapping ranges, one may minimize the total flow of heat energy and depletion of the heat sink while incorporating energy from the ambient environment into the ITC.

Preferably, working fluid in the outer heat pipe works when the chamber temperature is slightly below the target range. Working fluid remains vaporized at or just below set fracturing temperature (lowest temp in preferred range). In the inner heat pipe, the working fluid may work when the temperature is slightly above the bottom of the target range. The inner heat pipe may include a working fluid that remains liquid until the ITC reaches a temperature at or above $T_g$. Maintaining uniform temperature within the ITS chamber is ideal. In preferred embodiments, the range between the working fluid activation is above fracturing temperatures, and below $T_g$. The ends (evaporator of inner heat pipe and condenser of outer heat pipe) may remain in close proximity.

In some embodiments, the walls of the inner and outer heat pipe may be externally joined.

The internal transport of the condensed working fluid is difficult, especially over long distances or against gravity. Most heat pipes have a wicking material bonded to the interior walls of the chamber which transport the liquid by capillary action, but sometimes this effect can only overcome about 18" vertical difference between the evaporator and condenser. To prevent heat energy transfer in the inner heat pipe, portions of the heat pipe may be set in a vertical orientation with a wick array including an axial groove to prevent the working fluid liquid from moving without evaporation. When transporting condensed liquid against the flow of gravity in a vertically oriented heat pipe, with the condenser at bottom submerged in the heat sink, the working fluid will be condensing at the lowest point with respect to gravity. Vertical transport of liquid to the evaporator via wicking/capillary action is minimized as the gravity increases. By setting vertical portion close to 20-24" the heat transfer is minimized greatly until a set temperature threshold is reached. The inner heat pipe may be arranged with a gravitational minimum or lowest point somewhere between the condenser and evaporator (as in a U-shape or local minimum) to store the liquid when the temperature remains below maximum of predetermined ITC temperature range. Alternatively, inner heat pipe may be set to continually function as a partial resistor (with or without working fluid) to draw energy, either directly or as a function of temperature gradient, from ITC to heat sink. Similarly, the outer heat pipe may be arranged with a curved structure to prevent heat transfer as working fluid remains in a gaseous state. The internal diameter may be reduced, and/or length increased to minimize heat transfer when temperature is above the minimum of the preferred predetermined ITC temperature range. Other heat pipe configuration may include more than one working fluid within the heat pipe to fill the heat pipe with a vapor of a less-working fluid (such as a non-condensable gas) to depress action by primary working fluid.

Assuming a preferred predetermined temperature range (fracture temperature to glass temperature (such as −136 C (137K) to −120 C (153K))), the inner heat pipe may be activated at temperatures above −120 C, and the outer heat pipe may be activated at temperatures below −136 C. To maintain this predetermined temperature range, the heat pipes may begin to work within the range. For instance, the working fluid in the inner heat pipe may vaporize at −122 C or −125 C. or −130 C. Similarly, the outer heat pipe may condense fluid at −135 C or −130 C or −135 C. The predetermined range may be much narrower (within one degree, or less, or larger, great than 20 to 40 degrees C. Given the disparity between the heat sink at −196 C and the ambient temperature (room temperature of +20 C), it is understood that the heat sinks may be in constant working range. The temperature range being a preferred range may deviate, however, the dual nature of the inner and outer heat pipes may prevent extreme movement of temperature outside the predetermined range (e.g. +/−10 C).

As shown in FIG. 1, a typical heat pipe as known in the art is shown. As is used herein, the term heat pipe may refer to a sealed vessel or pipe that is evacuated and backfilled with a working fluid. The most common heat pipe is cylindrical in cross-section, but any shape may be used. The working fluid is typically a two-phase system balancing between liquid and gaseous form. The pipe is typically a vacuum tight unit also commonly referred to as an envelope. Heat pipe 1 includes a condenser 2 and evaporator 3. Wick 4 preferably forms on interior 8 of wall 5. An adiabatic section 6 sets between condenser and evaporator. Insulator 7 or insulation material may form around a portion of pipe 1. Heat pipe 1 has an interior diameter 9 and length 11.

Vapor and its associated latent heat flow toward the colder condenser section, where it condenses, giving up the latent heat. Capillary action then moves the condensed liquid back to the evaporator through the wick structure. Cooled/condensed working fluid (liquid) may move through the wick via capillary action along interior of walls 9 from the colder side (condenser) to the hotter side (evaporator). Working fluid liquid vaporizes at evaporator 3 and the vapor then moves through hollow center 13 via vapor pressure back to condenser 2. Preferably, condenser is thermally coupled to a heat sink whereby heat energy transfers through walls 5 of condenser 2 into heat sink (and is thus removed from system). As the working fluid condenses, releasing its latent heat in the condenser, and then repeats the cycle to continuously remove heat from part of the system. Typical heat sinks may be any cold storage unit or device, such as a fluid conditioning unit, or more passive cool store, such as a liquid nitrogen tank. When acting to cool, the outer heat pipe evaporator may be thermally attached or exposed to a cool sink. A cool sink may be any zone that is warmer than the item (chamber) being warmed, such as an environment, heater, or simply ambient atmosphere or room temperature.

Phase-change processes and the two-phase flow circulation in the heat pipe will continue as long as there is a large enough temperature difference between the evaporator and condenser sections. The fluid transport stops if the temperature is uniform, or the parameters of the operating temperature of the working fluid is exceeded. In such instances, the working fluid either remains entirely in liquid or vapor form, turning the heat pipe into a thermo-resistor, slowing or preventing heat energy flow therethrough. In some cases, when the heated section is below the cooled section, gravity is used to return the liquid to the evaporator. Conversely, when resistance is required outside of an operating temperature range, the condenser will be placed below the evaporator to pool working liquid in the condenser region and prevent or slow working fluid from exchanging or drawing heat energy from the evaporator region (and thus minimize heat energy transfer when the heat pipe is below a threshold temperature). Similarly, the heat pipe may be set with an operating range below a set temperature threshold, and the working fluid remains vaporized until the condenser of the heat pipe is lowered to the top of the working temperature range.

The heat pipe may be a variable conductance heat pipe and include a second (or further) working fluid(s) to the primary working fluid. A non-condensable gas (NCG) may be introduced, so that when heat is supplied to the evaporator, the working fluid vaporizes, and travels to the condenser, where it condenses. An additional space (or reservoir) may be set beyond the condenser region (far from evaporator) to store the NCG when in normal operating range. When the heat pipe is not operating, NCG and vapor co-exist throughout the vapor space. During operation, the NCG is swept toward the condenser end of the heat pipe by the flow of the vaporized working fluid. At high powers, all of the NCG is driven into the reservoir, and the condenser is fully open. As the temperature gradient is lowered, or beyond the working range, the vapor temperature drops slightly and since the system is saturated, the vapor pressure drops at the same time. This lower pressure allows the NCG to increase in volume, expanding out of the reservoir to block a portion of the condenser. This causes the heat pipe to act as a resistor, allowing the ITC to be held within a specific temperature range. The NCG reservoir and gas charge are sized so that the NCG volume blocks all of the condenser area when beyond operating range. This change in active condenser length maintains the evaporator from working as a standard heat pipe. As such a variable conductance heat pipe may only conduct heat when the vapor pressure generated by the evaporator is high enough to push the non-condensable gas away from the condenser, so the pipe is sensitive to the evaporator temperature. Such a variable conductance heat pipe may be preferred for the inner heath pipe, while utilizing a resistor or standard heat pipe for the outer heat pipe. The inner heat pipe evaporator may be placed in the intermediate temperature, or patient, chamber. When the chamber is too warm, pressure generated by evaporating gas in the pipe will push the non-condensing gas blanket away from the condenser and allow heat transfer into the heat sink, e.g. LN2 reservoir. When the ITC is too cold, the evaporator may not receive enough heat energy to generate enough pressure, thereby preventing working fluid from being transported to the condenser. In such an embodiment, the outer heat pipe may be made of a standard heat pipe susceptible to dry-out (total working fluid evaporation) when the chamber is too warm, and thereby function as a thermal resistor to resist movement of heat energy into ITC.

Alternatively, a standard heat pipe may be modified with the introduction of a small partial pressure of non-condensing gas (particularly to the inner heat pipe) to assist in maintenance of a minimum internal pressure within the pipe so as to allow all the working fluid to be simultaneously condensed. This modified pressure heat pipe is similar to a variable conductance heat pipe described above, but distinct as the NCG serves a different purpose. As described above, the pipe utilized a non-condensing gas is stored in a reservoir to blanket the condenser and prevent thermal transfer when the evaporator is too cold. In contrast, with a modified pressure heat pipe, NCG may be co-located or intermingled with the working fluid, and serves the purpose of maintaining a minimum absolute pressure in the otherwise evacuated chamber of the pipe, so as to allow complete condensation of the working fluid.

Figure 4:
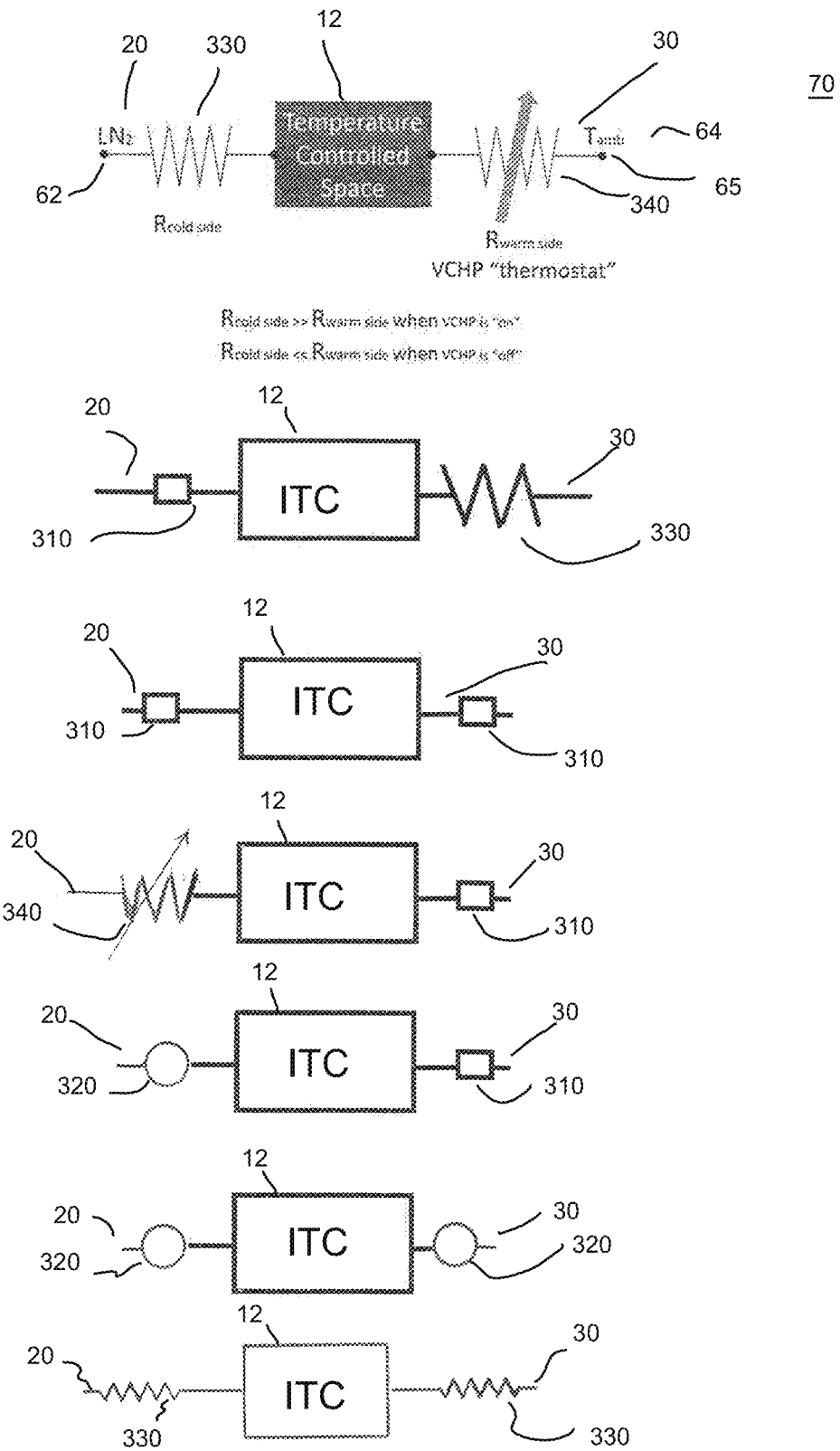
FIG. 4 illustrates alternative symbolic diagrams of ITCs of preferred embodiments of the present invention.

As in standard heat pipes, where the only material present within the pipe is the working fluid, (with the exception of very special fluids,) one cannot achieve total condensation of the working fluid. As more fluid condenses, the pressure drops within the pipe. Eventually, we get to a point where the pressure is too low within the pipe to continue condensing gas (i.e. pressure-induced boiling point elevation)—this means there will always be working fluid transitioning between gas and liquid, making it available to transport heat. However, by adding enough non-condensable gas in to the pipe along with a working fluid, we may cause complete condensation of the working fluid. As further described below, by completely condensing the working fluid, one may reduce the rate of heat leakage from the patient ITC into the heat sink, e.g. LN2 reservoir. Various heat exchange system diagrams are shown in FIG. 4.

Figure 2:
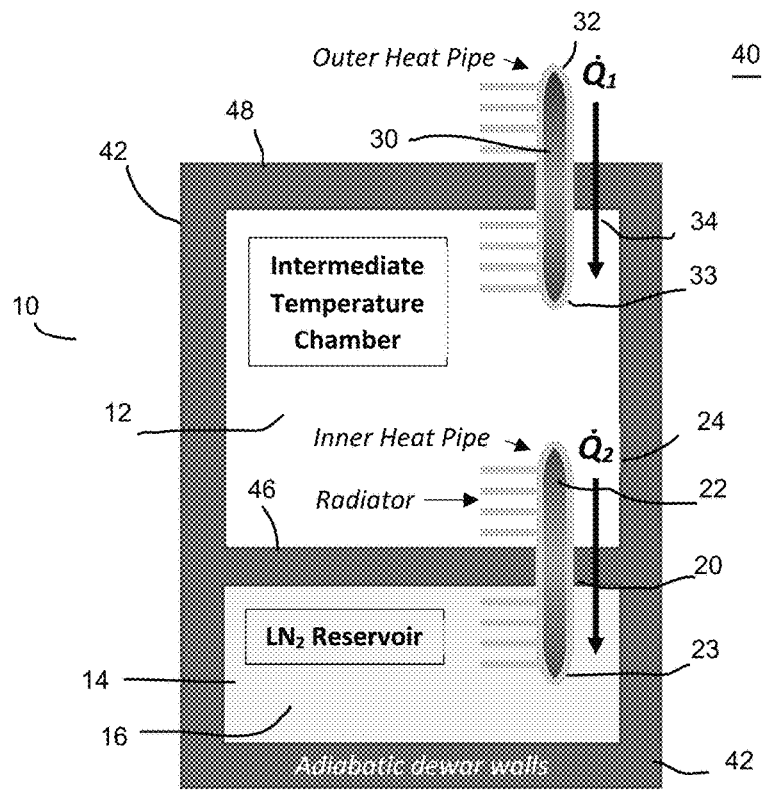
FIG. 2 illustrates a cross-sectional diagram of an ITS of an embodiment of the present invention.

Referring to FIG. 2, a basic diagram of an intermediate temperature storage (ITS) system is shown with an intermediate temperature chamber (ITC). The ITS acts to maintain a preferred temperature or temperature range within the ITC. ITS 10 includes surrounding insulating walls, such as Dewar walls 42. A cryogenic storage Dewar (named after James Dewar) is a specialized type of vacuum flask used for storing cryogenic tissues. Dewars may have walls constructed from two or more layers, with a high vacuum maintained between the layers to provide thermal insulation between the interior and exterior of the Dewar. ITS 10 includes ITC 12. ITC 12 preferably contains biological tissue, such as a cryogenically frozen patient. ITC may also contain a working gas, preferably neutral that will not disturb the patient or tissues. Preferred working gases include inert gases, noble gases, or most commonly nitrogen gas. The patient may be surrounded by nitrogen gas sourced from a small amount of the nitrogen evaporating from the liquid reservoir heat sink. As the evaporated nitrogen gas passes from the heat sink it can be directed through the ITC patient chamber to purge any moisture and oxygen. The movement of gases may clear out any reactive gases (e.g. oxygen, cryoprotectant, etc.) that may find their way in to the space within the ITC. The moving gas may be conditioned by exposure to a condenser end of an OHP or other warmer item to prevent 77K nitrogen gas from entering ITC.

Heat exchange between the patient in the ITC and the heat pipe(s) may be conducted by convection and thermal diffusion within the ITC. ITC 12 may be thermally coupled to a heat sink 14 such as a liquid nitrogen tank. The inner heat pipe (IHP) 20 may be thermally coupled to the ITC, either along a side wall (either outside or within the ITC) or extends into the ITC 12. Evaporator 2 of IHP 20 is exposed to temperatures, or energy emanating from, ITC 12 and causes energy transfer 24 out of ITC 12 into heat sink 14. Condenser 23 of IHP may be set in the heat sink 14, and may be sent along the heat sink or extending into the reservoir 16 of liquid nitrogen (as shown in this illustrious example. Outer heat pipe (OHP) 30 includes a condenser 33 thermally coupled to ITC, either along walls or extending into ITC. Evaporator 32 of OHP 30 is thermally coupled or exposed to a cool sink, here shown as an ambient environment 40. Insulation 44 walls surround the ITS, but an exception may be made whereby the OHP contains an evaporator region that is at least partially set outside outer external walls 48. Interior compartment walls 46 may supply thermo-insulation to maintain separate isolated compartments within the ITS.

Figure 3:
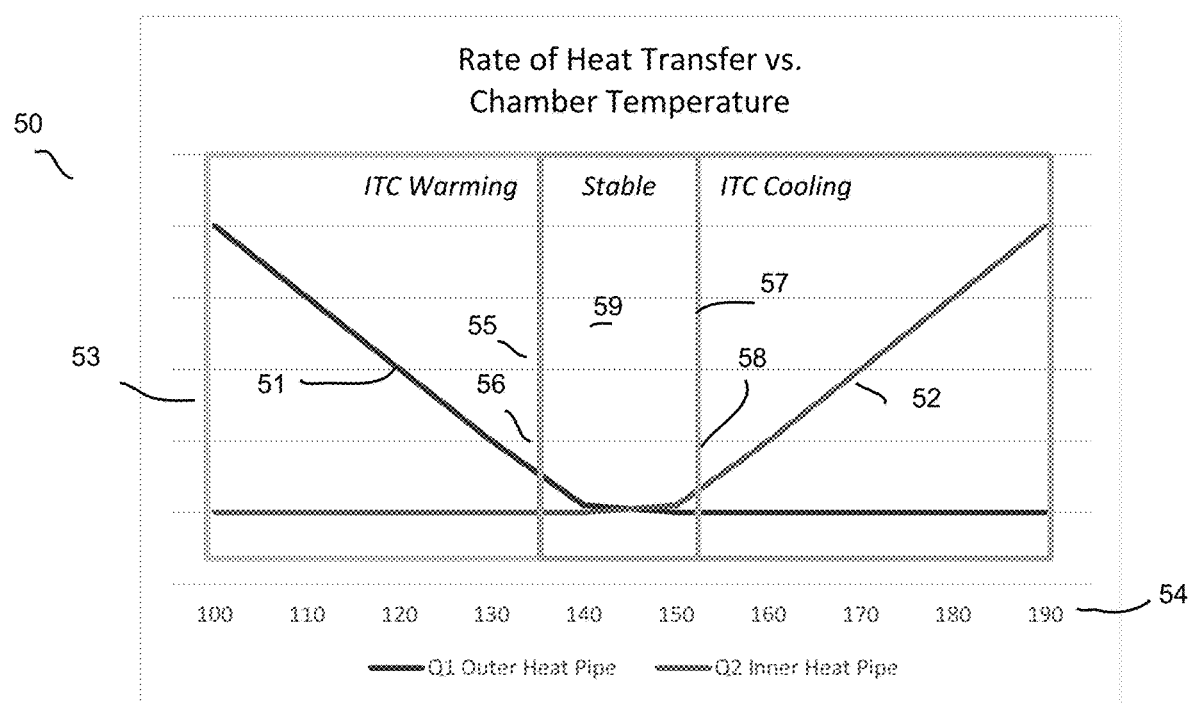
FIG. 3 illustrates a chart demonstrating preferred temperature ranges of the ITC of an embodiment of the present invention.

Preferred operation of the ITS is shown via temperature and heat transfer diagram of FIG. 3. Diagram 50 shows the Q rate 53 on the vertical axis and the temperature 54 on the horizontal axis in both Celsius and Kelvin. In warming range 56 below approximately 137K/−136 C, Q1 51 of OHP introduces energy flux into the system. Preferably, the rate of energy transfer is positive at temperatures below warming threshold 55, and Q1 causes heat to enter system when ITC is too cold. The warming threshold 55 may be within the predetermined temperature range 59 for ITC, or may be set somewhere below or above predetermined temperature range 59. The shape and degree of the Q1 and Q2 curves 51 and 52 respectively are not as meant to be informative, rather the concept of the increase in energy transfer is described. When ITC temperature is too high (hot), in cooling range 58, IHP causes Q2 52 heat transfer out of ITC. At a stable temperature within predetermined temperature range 59 the activity of both IHP and OHP may be depressed. When curves are depressed, preferably the IHP and/or OHP serve as resistors to energy transfer. This may be accomplished by the choice of working fluid and/or pressure in each of the IHP and OHP. In some embodiments, the IHP and OHP may include the same or a mixture of multiple fluids, including the same working fluids. However, it is preferred that the IHP only works above a set temperature that is higher than the temperature of the heat sink (e.g. liquid nitrogen at 77K). For instance, IHP may include a working fluid such as pentane (in aluminum or stainless-steel pipe wall) wherein pentane may be dormant below 173K. A more preferred working fluid for IHP would be propylene which has a workable operating range above 123K or ethane working above 103K. Exact working temperature range may be dependent on heat pipe mechanical design and pressures. Stainless steel and aluminum would work with the above working fluids, and nickel is workable with propylene. For the OHP, it is preferred that the OHP does not work in operating range above a set threshold. A preferred working fluid of OHP may be oxygen which typically vaporizes at about 110K. The size, pressure, diameter, working fluid(s), and other parameters of the heat pipes may be modified to ensure preferred predetermined temperature range may be achieved. Appropriate working fluids for the IHP and/or OHP may be determined by the operating range, and Merit number at known temperatures of the working fluids. Merit number is understood as a function of:

$$N_l = \frac{\rho_l \sigma \lambda}{\mu_l}$$

Whereby Merit Number, N, is a function of the liquid, l, and equals the liquid density, $\rho$, at a given temperature, times the surface tension, $\sigma$ of the working fluid, times the latent heat, $\lambda$, divided by the liquid viscosity, $\mu$. Working fluids should be chosen that have a high Merit Number to cause heat transfer in the appropriate working temperature ranges for both the IHP and/or OHP. When used as a resistor, working fluids may include a lower Merit number.

The term heat pipe herein is used to refer to heat pipes, but also other linear-type couplers useful in joining two separated/insulated sections/compartments. For instance, the term heat pipe used herein may refer to a variable conductance heat pipe or a resistor. Given the set temperature of the heat sink using liquid nitrogen, and the ambient pressures on the ITC to raise to an ambient temperature (constantly bringing in outside heat), the IHP may be set with a resistor and in constant energy flux with the heat sink. Instead of two serial heat pipes, the IHP may include a passive thermal resistor (such as a conductive thermal path). The IHP may have a deliberately set value, with a quasi-steady flow of heat from the ITC to the heat sink. Similarly, heat pipe for OHP may refer to a variable conductance heat pipe. In such a heat pipe, the resistance of the heat pipe would be much larger when the heat pipe is "off", and much smaller when the heat pipe is "on". The temperature oscillation of the ITC would depend on the values of the various resistances, the thermal mass of the ITC, and the hysteresis of the heat pipe. The hysteresis of the heat pipe may depend on the volumes that can be devoted to the condenser and inert gas reservoir within the OHP.

Alternative energy flow diagrams are shown in FIG. 4. Heat sink 62 is coupled to cool side 64 of ITC 12 via IHP 20. Cool sink 64 is connected to warm side 65 of ITC 12 via OHP 30. OHP and IHP may be comprised of a resistors to limit heat transfer from ITC to heat sink and cool sink. Variable conductive heat pipes 340 may be set as OHP or IHP, for instance serving to cause variable heating to ITC from cool sink, such as an external room 70 of ambient temperature. When OHP is a resistor, heat transfer into the system may be controlled by changing the ambient temperature (albeit this is a more proactive, rather than passive, system). ITS may be moved to new environs to modify the ambient temperature.

That patient in the ITC is preferably suspended between two heat sinks (or a heat sink and a cool sink) with the top of chamber removing heat energy from ITC to heat sink via IHP, and an OHP, preferably on the bottom of the ITC transporting heat into the ITC from the environment. Whether or not dry evaporated nitrogen gas is routed from heat sink reservoir through the patient chamber is not critical. Preferably, the working fluid and design of the OHP is selected so that, at the condenser inside the patient chamber, working fluid only condenses to liquid when temperature of the chamber is colder than a target, either in the range, or above the predetermined range. In this way, heat is preferentially transported into the ITC through the OHP when the chamber is cold enough to condense the gas inside the OHP. If the temperature is too high, the OHP might be predominantly filled with gas and acts as a strong resistor.

Similarly, the IHP will be designed so that the working fluid remains liquid when too cold to prevent transport of heat out of ITC to heat sink. Heat can only be transported out of the ITC through the inner heat pipe when the chamber is hot enough to evaporate the gas inside the IHP. If the temperature is too cold, the IHP might be predominantly filled with liquid and act as a strong resistor. The IHP may be arranged (partially) vertically to pool working fluid, and may include axial wick to prevent capillary action until a top temperature threshold is reached.

The combination of these two effects—OHP warming if the ITC gets too cold, and IHP cooling if the ITC gets too hot, serves to dynamically, yet passively, maintain temperature of ITC in a set range. Heat pipe working fluids are not so predictable, and other design elements must be considered, such as specific condensation or evaporation temperatures, volume, pressure, phase transition temperature, and liquid:gas ratio.

The preferred system may include any of the embodiments shown, however, the use of a resistor, or standard heat pipe capable of dry-out, as the OHP is preferred to prevent excessive heat energy loss to ambient environment. The use of a variable conductive heat pipe, or modified pressure heat pipe (discussed above), as the inner heat pipe is preferred, as the heat transfer can be slowed by condensing working fluid into a liquid or otherwise slow energy transfer into the heat sink when temperatures are too low.

Various diagrams (seven (7)) are set forth in FIG. 4 showing alternate and preferred embodiments for the heat pipes. ITC 12 as the temperature-controlled space is set between an IHP 20 and OHP 30. IHP 20 leads to heat sink 62, e.g. LN2 reservoir, while OHP 30 leads to cool sink 64 as ambient space 70. Standard heat pipes 310 may be used for one or both of the IHP and OHP. The modified heat pipe 320, as described above, may be used as shown, or preferably as the IHP paired with a resistor. Similarly, a standard heat pipe as IHP may be paired as a resistor, the use of a resistor as OHP being one preferred embodiment for all IHP types. A variable conductance heat pipe 340 may be used, preferably as the IHP. Resistors 330 may be used for either or both IHP and/or OHP. All components and types of heat pipe, be they standard, modified, variable conductance and/or resistor may be used for IHP and/or OHP. Specific features of the heat pipes, including internal pressure, size, drop, etc. should be attuned to achieve the objects of the present invention.

Figure 5:
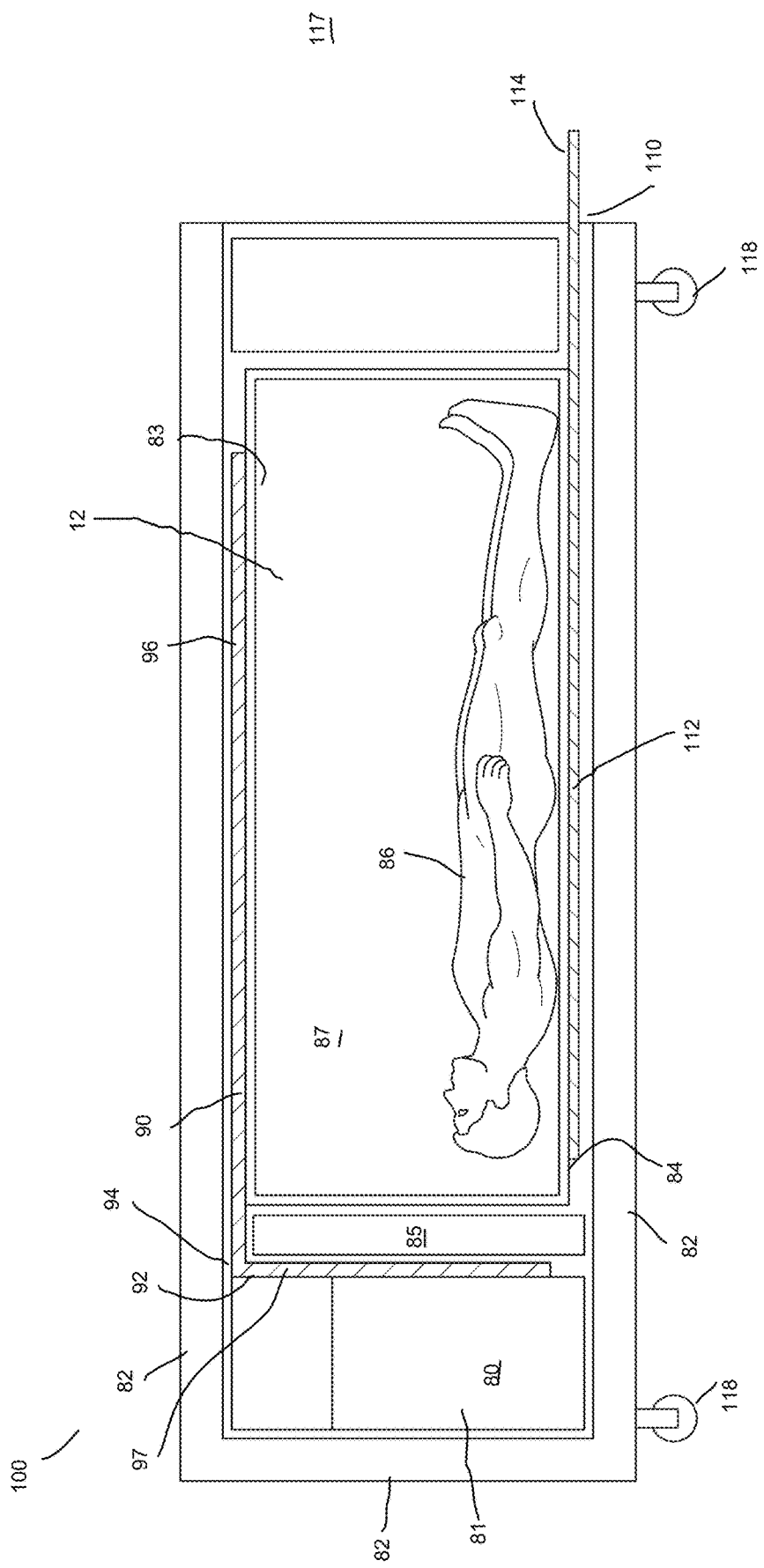
FIG. 5 illustrates a cross-sectional diagram of a preferred embodiment of the present invention.

As shown in FIG. 5, a preferred embodiment is shown in cross-sectional diagram. ITC 12 includes a specimen 86 biological tissue, such as a patient, suspended in chamber. Gas 78 fills ITC 12 and heat may be conducted via convection. Liquid Nitrogen (LN2) reservoir 81 serves as heat sink 80 and is thermally coupled to IHP 90. IHP 90 may include condenser 92 thermally coupled to heat sink 80. IHP may include bend 94 that sets condenser 92 with a vertical section 97 that can pool working fluid when temperatures are too low. Evaporator 96 of IHP is preferably set along the top 83 of ITC 12. Evaporator 96 may extend into ITC, or thermally coupled to the top wall, either inside and/or outside the ITC. Convected heat rises through gas 87 to transfer heat to evaporator 96. Heat transfer in IHP 90 passes into heat sink 80 at condenser 93. An internal insulating wall or block 85 may physically and/or thermally separate ITC 12 from reservoir 81. IHP 90 may pass through or around block 85. OHP 110 is preferably set along a lower area, such as bottom 84 or ITC 12. Condenser 112 of OHP 110 may be set along the lower are of ITC and the OHP may extend beyond a lid or insulation wall 116 to ambient environment 117. Preferably, the ITS 100 is set within a Dewar container 82 to insulate system. Only OHP 110 and outer walls of Dewar are exposed to Ambient temperatures. Dewar walls insulate, while OHP may alternatively expose heat energy and introduce heat to ITC. Preferably, ITS may be on wheels 118 to allow transport of system, such as to new room, to relocate locations, and/or change ambient conditions.

Figure 6:
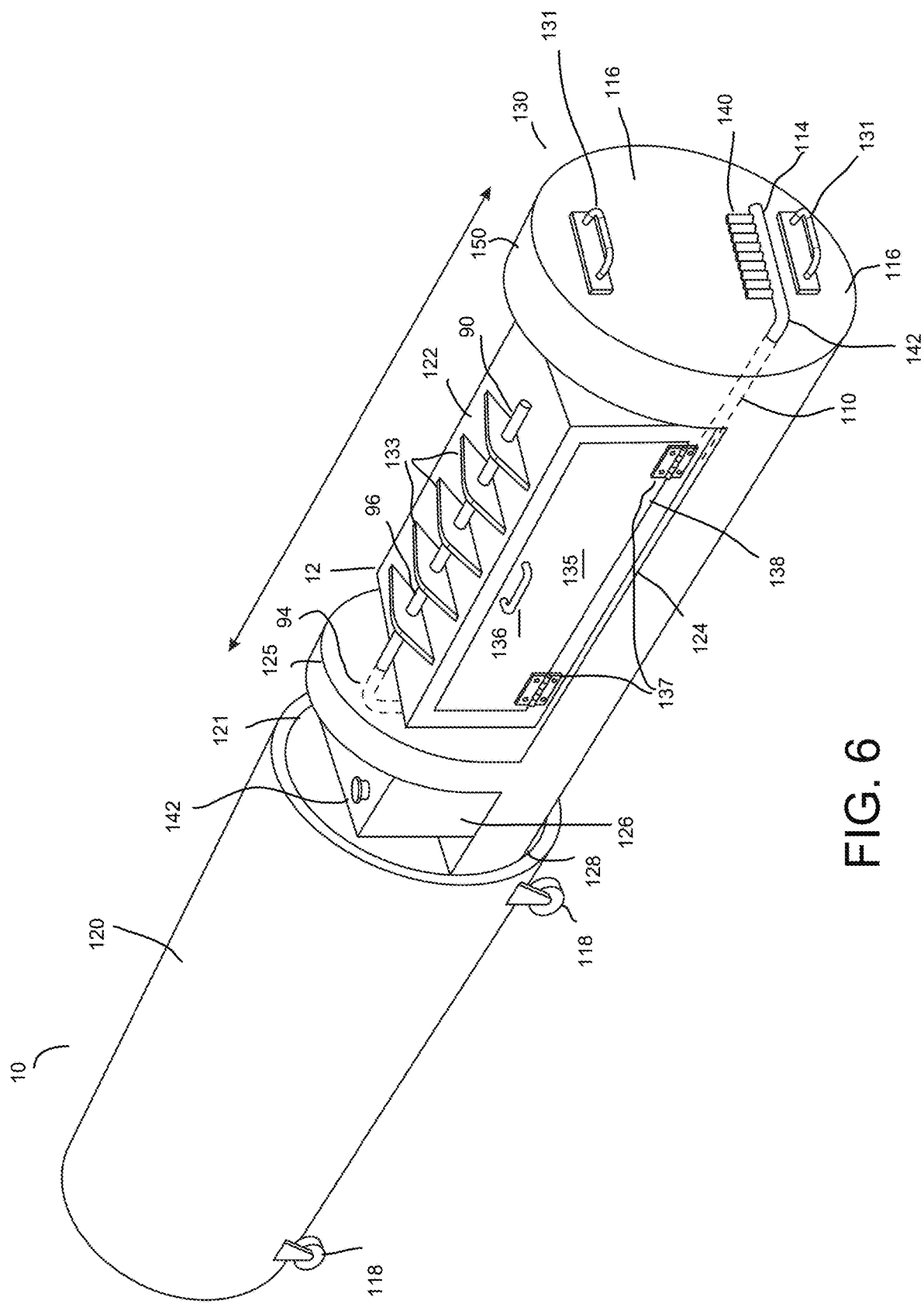
FIG. 6 illustrates a perspective partially exploded view of a preferred embodiment of the present invention.

As shown in FIG. 6, a more concrete example of ITS 100 is shown wherein ITS is set horizontally to allow the patient to be set lying down. Dewar 120 forms a complete capsule into which a slidable module 130 may be there emplaced. Module 130 may include a slide that complementarily mate with slide racks 128 on internal wall 121 of Dewar capsule 120. Module 130 supports heat sink as liquid nitrogen reservoir 126, preferably set deep into capsule 120. Module supports insulating block 125 between heat sink and ITC 12. ITC includes patient chamber 138 set on module 130. ITC 12 may include an access panel or door 135 that is set with hinges 137 to allow rotational opening of door 135 via handle 136. IHP 90 is set along top 122 of ITC and held in place via brackets 133. IHP evaporator 96 acts along top 122 of ITC 12. Top of ITC serves as a form of resistor to limit heat transfer out of ITC. IHP 90 has bend 94 before condenser region (not shown). OHP 110 is set at bottom 124 of ITC with condenser 112 below ITC. OHP 110 extends out of wall 116, and may include fins 140 at evaporator 114. Exterior handles 131 may be used to manually slide module 130 into capsule 120 along rack. A circumferential, e.g. annular, seal 150 may set around block 125 to hermetically seal ITS. Preferably, seal 150 mates with complementary feature on interior 121 of Dewar capsule 120 via a complementary seal or recessed groove. ITS 10 may be set on wheels 118 to allow for movement of ITS, as discussed above. The total heat flow through this preferred embodiment ITS may only be on the order of dozens of Watts. The heat flow into a vertical LN2 reservoir with a 40" opening and a 24" thick Styrofoam plug is about 25 W. A refill port 142 may be set on capsule 120 or at door 135 to allow refilling heat sink reservoir without disturbing/exposing ITC module. While capsule is described as a Dewar, any resistor or insulation material for suitable construction may be used.

Figure 7:
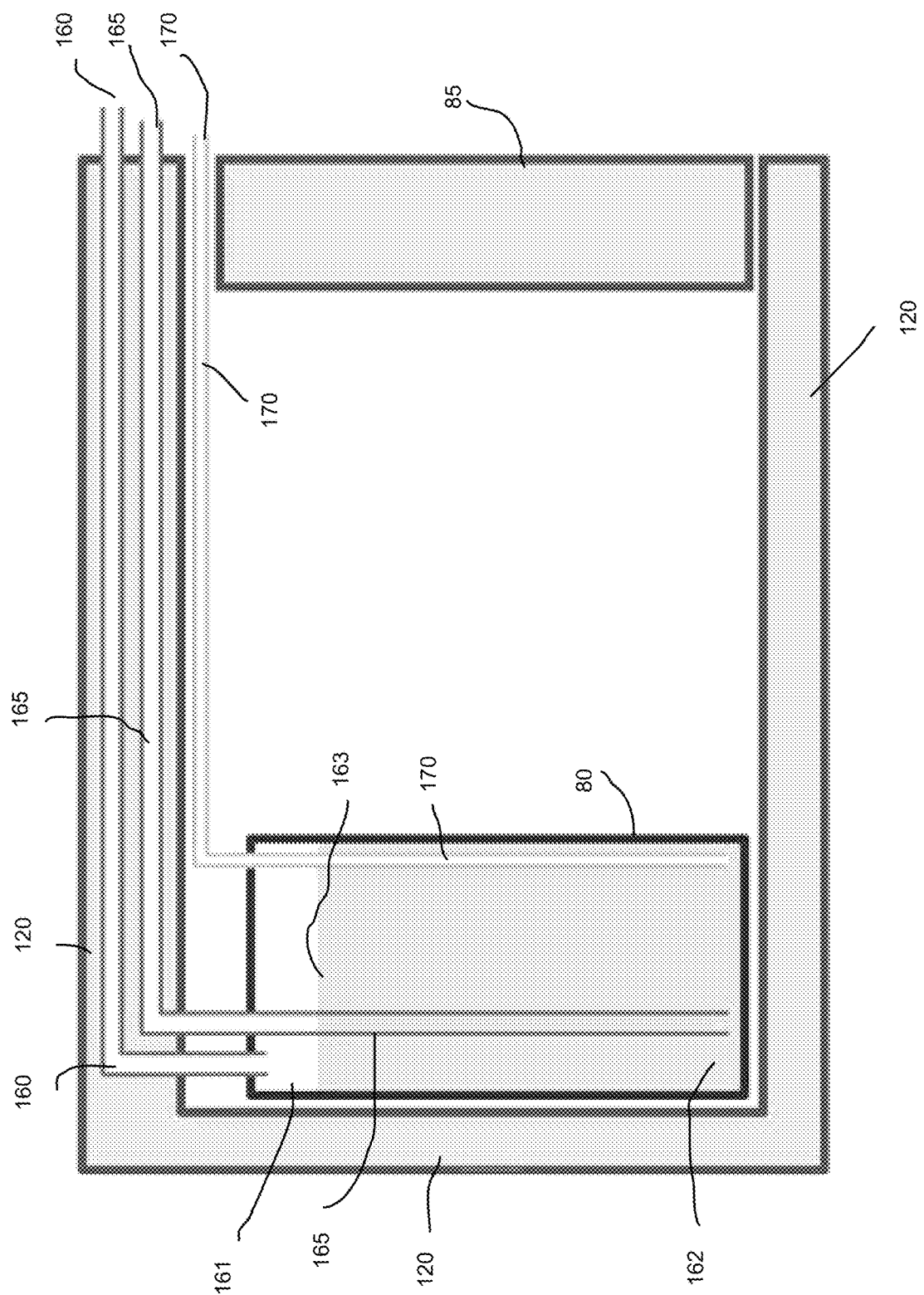
FIG. 7 illustrates a side cross-sectional diagram of an ITS with liquid reservoir of a preferred embodiment of the present invention.

As shown in FIG. 7, heat sink 80 reservoir may be sealed with a cork (not shown), or have a complete seal except for three access types. Heat sink 80 may be set within capsule 120 and next to insulation wall 85. Given that liquid nitrogen vaporizes above 77K (1 atm), the internal pressure of the reservoir will rise without exhausting. A gas vent tube 160 may provide access to reservoir head space 161 to allow higher pressurized nitrogen gas to escape. A fill tube 165 may be in contact, preferably low at bottom 162 and below the fill line 163 to allow introduction and refill of liquid nitrogen into reservoir, as may be periodically required. The fill level of the reservoir may be determined from outside the capsule by any number of measuring tools known in the art, preferably a manometer dip tube 170. The dip tube may also be set near bottom 162 and allow pressure readings to determine quantity of liquid in reservoir 81 and need for refill (or when to stop refill to prevent overflow). Used herein, the cooling fluid is commonly referred to as nitrogen (liquid and/or gas) but any cooling fluid may be used interchangeably that satisfies the cooling requirements, such as oxygen, methane, neon, hydrogen, helium, ethane, ammonia, etc.

Any number or combination of these tubes can be run within the vacuum space of the Dewar walls in capsule if not within the Dewar capsule itself. Routing any of these tubes through the wall of the Dewar may require welded or otherwise affixed ports through the interior shell of the Dewar flask, thus necessitating the reservoir be more fixed relative the capsule, and not slide on the same sliding platform as the ITC or patient chamber. Preferably, all three tube types may be routed through the vacuum wall of the Dewar capsule. This would be embodied by a fixed LN2 reservoir that sits at the back of the Dewar capsule, while the entire patient/heat pipe assembly would slide freely. The IHP would be thermally coupled to the reservoir when the sliding platform is fully inserted into the capsule. As predicted heat flux rates will be relatively low, very good thermal connection will not be required, and the IHP may simply mechanically touch an outer wall of reservoir. Two complementary, or interlocking, combs such as aluminum or steel, etc. may be used, one on the outward face/wall of the LN2 reservoir and the other on the inward face of the sliding platform connected to the IHP. The complementary combs may be located in such a way that the teeth of the aluminum combs intermesh/interlock with each other when the sliding platform is located all the way into the capsule.

The gas vent and fill tubes may be permanently left open as a means of diverting cooling gas out of the capsule without impacting the temperature of the ITC, or the capsule could be sealed off to force the cooling gas through some other channels which exchange heat with the ITC patient chamber (as in the air-conditioned configuration discussed below, with reference to FIG. 8).

Figure 8:
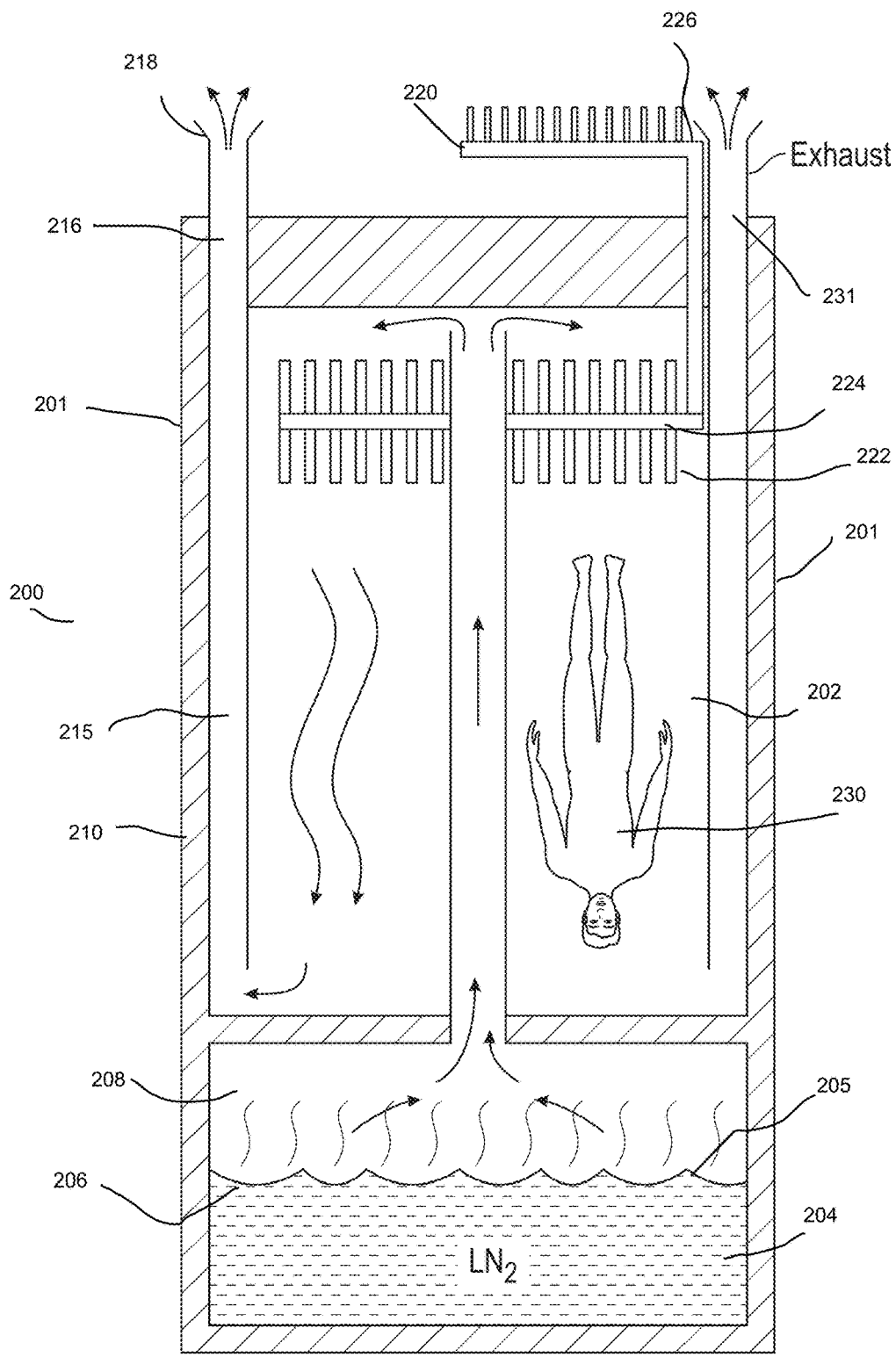
FIG. 8 illustrates a side cross-sectional view of another preferred embodiment of the present invention.

As shown in FIG. 8, an alternative ITS system is shown requiring only one heat pipe as OHP, and patient chamber in vertical orientation. ITS 200 includes reservoir 204 and quantity of cooling fluid 205 filled to fill line 206. Head 208 of reservoir 204 may be filled with evaporated cooling fluid (e.g. nitrogen gas). ITC 202 houses patient 230 at predetermined temperature range. Cooling gas flows out of reservoir 204 through gas pathway 210 past ITC and may be diverted into ITC through condenser 224 of OHP 220. Condenser 224 may be outfitted with external features to increase surface area and energy transfer, such as fins 222. Fins 22 may be blades, array, or screen to ensure high energy transfer as gas passes. Heat from ambient 219 is transferred into gas as it enters ITC through finds 222. Preferably, gas is heated to a preferred temperature as it enters ITC.

Cooling gas may also be diverted from gas pathway 210 to exhaust path 215 and out through exhaust tube 216 to exit 218 to ambient 219. Similarly, gas may pass from ITC out to ambient (and may or may not join exhaust tube 216). ITC exiting gas may have its own insulated exhaust path 231. Evaporator 226 of OHP 220 may be exposed to ambient 219, or another cool sink (such as a warming fluid reservoir, e.g. ammonia, R134a, acetone, methanol, etc.).

In the "air-conditioner" type ITS embodiment, LN2 evaporates into a cooling fluid gas from the reservoir, and is channeled through a heat exchanger, which may be connected to a heat pipe. A heat pipe may bridge the heat exchanger inside the ITS capsule with a thermal collector outside the capsule (at a cool sink). That heat pipe may be designed such that the working fluid condenses at roughly the ITC target temperature or temperature range. This arrangement may "fix" the heat exchanger blades at a transition temperature. By elevating condensed fluid in the OHP up to an external evaporator at top of ITS, OHP may employ a pulsating heat pipe as is known in the art of electronics.

Given the average heat flow of 25 W through a 24" cork disk of diameter 40", the heat of vaporization of LN2 is approximately 199 J/g. Thus, the total mass evaporation rate of LN2 is 25 J/s divided by 199 J/g=0.126 grams per second of LN2 evaporation.

Given that LN2 is 0.808 g/mL (1 atm), 0.126 grams per second is 0.156 mL per second equals approximately 13.5 liters per day of liquid LN2 evaporated. As the density of nitrogen gas at −140 C and 1 atm is approx. 2.56 g per liter, 0.126 g/s divided by 2.56 g/L times 60 equals 2.95 liters per minute of gas flow.

The preferred patient chamber in the ITC is sized at approximately 12"×24"×84" (1'×2'×7') in a system with only one patient chamber. A system may include multiple patient chambers in the ITC or as separate ITCs. Each ITC may share an OHP and IHP, or may include its own IHP and/or OHPs. A series of solid blocks of some kind (perhaps Styrofoam) may be used to fill all of the large air spaces around the ITC and within the capsule to minimize the free volume within the chamber. This will decrease the amount of time required to fully replace the volume of air within the chamber. Preferably the excess air volume in the chamber is at or below 177 L, so that the standard gas flow rate from cooling gas will replace the air in the chamber once an hour. Such an air-conditioned system would probably need a provision to temporarily add more heat to the LN2 reservoir to increase gas flow during the initial phase of equilibrating the patient with the chamber, or utilize a larger, or multiple OHPs.

The ITS may include a hybrid of the dual heat pipe and air-conditioned embodiments. By routing some of the cooling gas through channels near the OHP condenser (to warm it to ITC temperatures), the gas may then be directing through the patient chamber to improve the cooling properties of the system. The IHP pipe may still be used to accelerate the rate of heat transfer from the ITC into the LN2 reservoir, which is most useful when the patient(s) are initially placed inside the ITS.

I claim:

1. A system to maintain environmental temperature within a cryogenic chamber containing biological material, said system comprising:
   a. a chamber comprising insulating walls, an interior with an interior space containing the biological material, and an exterior;
   b. said chamber thermo-coupled with an evaporator of a cooling heat pipe;
   c. a heat sink thermo-coupled to a condenser of said cooling heat pipe;
   d. a warming heat pipe thermo-coupled with a condenser; and
   e. a cool sink thermo-coupled to an evaporator of said warming heat pipe.

2. The system of claim 1 wherein said warming heat pipe comprising a first contained working fluid, and said cooling heat pipe comprising a second contained working fluid, wherein said first working fluid and said second working fluid comprise the same chemical formula.

3. The system of claim 1 further comprising an insulating capsule containing said heat sink, said cooling heat pipe, and said chamber.

4. The system of claim 3 further comprising an insulating block set between said chamber and said heat sink.

5. The system of claim 3 wherein said capsule comprises Dewar walls.

6. The system of claim 3 wherein said chamber and said heat sink are supported by a frame set on at least one slide track mounted along an interior side of said capsule.

7. The system of claim 3 wherein said capsule comprises a unitary body including an insulating block set between said heat sink and said chamber, and an end wall comprising a circumferential seal adapted to complementarily mate with said capsule when said unitary body is set within said capsule encapsulating said heat sink, said chamber, and said cooling heat pipe.

8. The system of claim 7 wherein said warming heat pipe passes through said end wall.

9. The system of claim 1 wherein said cooling heat pipe is coupled to a top of said chamber.

10. The system of claim 9 wherein said cooling heat pipe comprises a vertical section between said evaporator and said condenser.

11. A thermo-regulated cryogenic intermediate temperature chamber for the storage of biological tissue, said chamber containing biological tissue, said chamber thermo-coupled with an evaporator of a cooling heat pipe, and a heat sink thermo-coupled to a condenser of said cooling heat pipe, further comprising a warming heat pipe, said chamber thermo-coupled with a condenser of a warming heat pipe, and a cool sink thermo-coupled to an evaporator of said warming heat pipe; said cooling heat pipe, said warming heat pipe, and said chamber arranged to maintain a temperature of an interior of said chamber within a predetermined temperature range.

12. The thermo-regulated cryogenic intermediate temperature chamber of claim 11 wherein said cooling heat pipe activates when said chamber interior is above a set cold temperature threshold of at least 100K.

13. The thermo-regulated cryogenic intermediate temperature chamber of claim 11 wherein said warming heat pipe activates when said chamber interior is below a set hot temperature threshold of at most 170K.

14. The thermo-regulated cryogenic intermediate temperature chamber of claim 11 wherein said cooling heat pipe comprises a working fluid of pentane.

15. The thermo-regulated cryogenic intermediate temperature chamber of claim 11 wherein said warming heat pipe comprises a working fluid of oxygen.

16. The thermo-regulated cryogenic intermediate temperature chamber of claim 11 wherein said cooling heat pipe comprises a working fluid of ethane.

17. The thermo-regulated cryogenic intermediate temperature chamber of claim 11 wherein said cooling heat pipe comprises a vertical section between the condenser and evaporator, wherein the condenser is lower than said evaporator, and said cooling heat pipe further comprises an axial groove wick.

18. The thermo-regulated cryogenic intermediate temperature chamber of claim 11 wherein the evaporator of said cooling heat pipe is positioned at a top of said chamber.

19. The thermo-regulated cryogenic intermediate temperature chamber of claim 18 wherein the condenser of said warming heat pipe is positioned at a bottom of said chamber.

20. The thermo-regulated cryogenic intermediate temperature chamber of claim 11 wherein said chamber comprises a biological specimen and a circulating gas.

21. A thermo-regulated cryogenic intermediate temperature system, said system comprising a chamber containing biological tissue, said chamber comprising a warming heat pipe, said chamber thermo-coupled with a condenser of a warming heat pipe; and a cool sink thermo-coupled to an evaporator of said warming heat pipe; said chamber in fluid communication with a reservoir of a cooling fluid via a cooling gas pathway passing the condenser of the warming heat pipe between said reservoir and said chamber; said warming heat pipe and said chamber arranged to maintain a temperature of an interior of said chamber within a predetermined temperature range.

22. A thermo-regulated cryogenic intermediate temperature chamber to maintain environmental temperature within a chamber adapted to contain biological tissues, said system comprising:

a. a chamber comprising insulating walls, an interior with an interior space comprising the biological tissues and an exterior;
b. a warming heat pipe comprising an OHP condenser thermally coupled with said chamber, said warming heat pipe further comprising an OHP evaporator thermally coupled with a cool sink; and
c. a heat sink thermally coupled to said chamber.

23. The thermo-regulated cryogenic intermediate temperature chamber of claim 22 wherein said heat sink is coupled to a cooling heat pipe, said chamber thermo-coupled to said cooling heat pipe.

24. The thermo-regulated cryogenic intermediate temperature chamber of claim 23 wherein said cooling heat pipe comprises a working fluid of pentane and/or ethane.

25. The thermo-regulated cryogenic intermediate temperature chamber of claim 21 wherein said warming heat pipe comprises a working fluid of oxygen.

* * * * *